(12) United States Patent
Kienberger

(10) Patent No.: US 7,221,752 B2
(45) Date of Patent: May 22, 2007

(54) METHOD AND CONFIGURATION FOR OPERATION OF AN OPERATOR SWITCHING POSITION IN A TELECOMMUNICATIONS SYSTEM

(75) Inventor: Helmut Kienberger, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/368,930

(22) Filed: Feb. 18, 2003

(65) Prior Publication Data

US 2003/0138096 A1 Jul. 24, 2003

Related U.S. Application Data

(63) Continuation-in-part of application No. 09/356,812, filed on Jul. 19, 1999, now abandoned.

(51) Int. Cl.
*H04M 3/00* (2006.01)
(52) U.S. Cl. .............................. 379/265.05; 379/265.12
(58) Field of Classification Search ........... 379/265.05, 379/265.1, 265.11, 265.12, 266.1
See application file for complete search history.

(56) References Cited

U.S. PATENT DOCUMENTS

| | | | |
|---|---|---|---|
| 5,274,700 A | | 12/1993 | Gechter et al. |
| 5,633,924 A | * | 5/1997 | Kaish et al. ............ 379/266.03 |
| 5,724,418 A | | 3/1998 | Brady |
| 5,825,869 A | * | 10/1998 | Brooks et al. ......... 379/265.12 |
| 5,946,386 A | * | 8/1999 | Rogers et al. ......... 379/265.09 |
| 5,978,467 A | * | 11/1999 | Walker et al. ......... 379/266.01 |
| 6,044,142 A | * | 3/2000 | Hammarstrom et al. .... 379/223 |
| 6,046,762 A | * | 4/2000 | Sonesh et al. ........... 348/14.11 |
| 6,161,135 A | | 12/2000 | Ehrlich et al. |
| 6,233,332 B1 | * | 5/2001 | Anderson et al. ...... 379/265.09 |

(Continued)

FOREIGN PATENT DOCUMENTS

WO   WO 96/31044   10/1996

OTHER PUBLICATIONS

B. Eckhardt et al.: "PAsst: Position access switching system for telephony networks", *PTR Philips Telecommunication and Data Systems Review*, vol. 47, Dec. 1989, No. 4, pp. 14-31.

(Continued)

*Primary Examiner*—Creighton Smith
(74) *Attorney, Agent, or Firm*—Laurence A. Greenberg; Werner H. Stemer; Ralph E. Locher

(57) ABSTRACT

A service feature server makes it possible to provide service features in addition to the service features that are already provided in a telecommunications system. A separate module is provided for this purpose in the telecommunications system, which coordinates the calling of service features on the service feature server and on the telecommunications system, and controls the presentation of the corresponding service features on an operator switching position. The operator switching position is intended to be, for example, a personal computer, for which an operator interface need be created only for the additional service features. Access is made to the standard operator interface in order to use standard service features, and to the additional operator interface for the additional service features. In particular, the new functionality offers the operator a plurality of queues, which he or she can access separately.

7 Claims, 6 Drawing Sheets

U.S. PATENT DOCUMENTS

| | | |
|---|---|---|
| 6,766,009 B2 * | 7/2004 | Williams et al. ............. 379/229 |
| 2002/0035616 A1 * | 3/2002 | Diamond et al. ............ 709/219 |
| 2003/0169866 A1 * | 9/2003 | Williams et al. ........ 379/220.01 |
| 2004/0015380 A1 * | 1/2004 | Timmins ........................ 705/8 |
| 2004/0161097 A1 * | 8/2004 | Henry ................... 379/266.02 |
| 2006/0200260 A1 * | 9/2006 | Hoffberg et al. .............. 700/86 |

OTHER PUBLICATIONS

Robin Harris Foster: "In the Forefront With Integrated Call Centers", *AT&T Technology*, vol. 7, Winter 1992, No. 4, pp. 8-13.

* cited by examiner

STEP 1 — MAKING QUEUE MANAGEMENT-RELATED SERVICE FEATURES AVAILABLE FOR AN OPERATOR AT A FIRST OPERATOR USER INTERFACE

STEP 2 — PROVIDING THE QUEUE MANAGEMENT-RELATED SERVICE FEATURES FROM A DEDICATED SERVICE FEATURE SERVER

STEP 3 — USING THE FIRST OPERATOR USER INTERFACE FOR COMMUNICATION WITH THE SERVICE FEATURE SERVER WHEN REQUESTING AND/OR PROCESSING QUEUES BY AN OPERATOR

STEP 4 — USING THE FIRST OPERATOR USER INTERFACE FOR ACCESSING A FIRST SUBSET OF THE QUEUE MANAGEMENT-RELATED SERVICE FEATURES

STEP 5 — PROVIDING, VIA THE TELECOMMUNICATIONS SYSTEM, A SECOND SUBSET OF QUEUE MANAGEMENT-RELATED SERVICE FEATURES

STEP 6 — USING THE FIRST OPERATOR USER INTERFACE AND/OR A SECOND OPERATOR USER INTERFACE FOR ACCESSING THE SECOND SUBSET OF QUEUE MANAGEMENT-RELATED SERVICE FEATURES

FIG. 6

METHOD AND CONFIGURATION FOR OPERATION OF AN OPERATOR SWITCHING POSITION IN A TELECOMMUNICATIONS SYSTEM

CROSS-REFERENCE TO RELATED APPLICATION

This is a continuation-in-part application of U.S. application Ser. No. 09/356,812, filed Jul. 19, 1999 now abandoned.

BACKGROUND OF THE INVENTION

Field of the Invention

Despite the increase in networking and automation of communications systems, there is still a need to be able to access the communication sequence manually. Operator switching positions or locations are known for use at telephone information positions. So-called call centers are also increasingly being set up in the field of commercial services in order to make it possible to react to customer requirements quickly and specifically and to configure the marketing of service products efficiently. Such facilities are characterized by a large number of incoming calls that have to be passed on to a number of operator switching positions. Such operator switching positions may be connected to a private branch exchange telecommunications system which includes, for example, software for call organization and for distributing the callers to the available operator switching positions. In this practical situation it is possible, for example, to draw a distinction between queues of internal callers and external callers and to provide a selection option at the operator switching position in order to select an internal or external communications subscriber. In addition to the availability of such a selection service feature, there may, however, be different requirements at the customer end with regard to available service features at the operator switching position. The increasing pressure of competition between communications system providers also results in that it is necessary to react as quickly and flexibly as possible to such market requirements.

The company prospectus from SGCS describes, for example, the provision of operator switching positions for use in call centers, in which online changes can be made to the configuration of the system. In this way, callers in different queues can be assigned to different operator switching positions.

SUMMARY OF THE INVENTION

It is accordingly an object of the invention to provide a method and configuration for operation of an operator switching position in a telecommunications system, which overcome the above-mentioned disadvantages of the prior art methods and devices of this general type, which method and configuration are flexibly configurable, and at the same time, involve as little technical implementation outlay as possible.

With the foregoing and other objects in view there is provided, in accordance with the invention, a method of managing queues in a telecommunications system at an operator user interface. The method includes: making queue management-related service features available for an operator at the operator user interface; providing the queue management-related service features from a dedicated service feature server; and using the operator user interface for communication with the service feature server when requesting and/or processing queues by the operator.

In accordance with an added feature of the invention, the telecommunications system communicates with the service feature server if access is made by the operator user interface to a service feature from at least one subset of the queue management-related service features.

In accordance with an additional feature of the invention, the method includes: adding, via the telecommunications system, a further subset of queue management-related service features to the queue management-related service features; and communicating between the operator user interface and the telecommunications system with regard to the further subset of queue management-related service features.

In accordance with another feature of the invention, the method includes presenting a plurality of subscriber queues at the operator user interface requiring at least some of the queue management-related service features.

In accordance with a further feature of the invention, the method includes selecting subscribers from a plurality of queues by using at least some of the queue management-related service features.

In accordance with a further added feature of the invention, the method includes: defining the operator user interface as a first operator user interface; using the first operator user interface for accessing a first subset of the queue management-related service features; providing, via the telecommunications system, a second subset of queue management-related service features; and using a second operator user interface for accessing the second subset of queue management-related service features.

The overall significance of the service feature server consists in enhancing the functionality of a telecommunications system as to handling queues of waiting callers incoming in the telecommunications system. Such a functionality usually draws resources from the telecommunication system if implemented in the telecommunication system directly. This has a negative impact on the call processing and switching performance of the telecommunication system. Therefore, the respective functionality is tasked out to the service feature server resulting in a reduced network load in the telecommunications system itself. For this purpose, the service feature service comprises means for administering queues, i.e. selecting queues for processing, splitting queues in several new queues, assigning waiting callers to queues, assigning queues to dedicated operators and signaling queues and calls to an operator. An operator is provided with means for actively selecting a queue or a caller for processing, e.g. if the respective operator is in idle state, communication is necessary between the service feature server administering queues and the respective operator requesting a queue for processing purposes. Therefore, the service feature server has to be accessible for operators. Communication between the service feature server and the telecommunication system might be necessary e.g. when assigning callers incoming in the telecommunication system to queues managed by the service feature server.

Generally, service features relating to queue management that are not by default implemented in a telecommunications system are provided by the service feature server. The requirements of the queues handled by the operators concerning the service feature server comprise providing functionality for splitting queues in several new queues, assigning waiting callers to queues, assigning queues to dedicated operators, signaling queues and calls to an operator and making queues and calls accessible by an operator.

With the foregoing and other objects in view there is also provided, in accordance with the invention, an improved method for operating an operator switching position in a telecommunications system, the improvement which includes: providing the operator switching position with a set of service features for switching subscriber calls; providing at least one subset of service features of the set of service features via a service feature server; and using the operator switching position to communicate with the service feature server with regard to the at least one subset of service features.

One particular advantage of the method according to the invention is that, by using the service feature server, it is possible to use existing resources, while the technical and investment outlay for the implementation remain low.

An advantageous feature of the described method is that the sharing of tasks between the telecommunications system and the service feature server is coordinated from the telecommunications system, since the calls arrive there and the communication complexity within the area of the system is thus reduced. The telecommunications system need communicate with the service feature server only to provide specific service features.

An advantageous feature of a development of the described method for providing specific service features is that the operator switching position communicates with the service feature server since this minimizes the network loads resulting from the service feature being called.

An advantageous feature in a development of the described method is that a plurality of subscriber queues are offered at the operator switching position, since this allows the communications subscribers to be assigned to the queues on the basis of different sorting criteria, such as their importance, their name, location, etc., and the operator can see how many communications subscribers there are in each of the queues.

As an advantageous feature in a development of the described method, the operator can select a communications subscriber from the various queues in order to allow a different decision to be made in accordance with the usage requirements. For example, this allows particularly urgent calls from the most senior manager to be handled first.

A particularly advantageous feature in a development of the described method is for different service features to be linked to different operator interfaces. Since this results in the implementation complexity for the use of additional service features being particularly low, owing to the fact that the standard operator interface can also be used when using standard service features which are provided, for example, in the switching computer, and appropriate input devices need be provided only for the use of additional service features. The additional input options can be stored in a particularly advantageous manner in the service feature server, and they can be made available to the operator switching position via a data network, for example a local area network.

A particularly advantageous feature of the configuration according to the invention is that the operator switching position is respectively connected to the telecommunications system and to the service feature server via two different types of line, while the latter is in turn connected to the telecommunications system via a data line. Therefore, advantageously the standard telecommunications systems can be used and the connections for the operator switching position to this telecommunications system can still be used.

Furthermore, a high level of flexibility for the implementation of different service features can be ensured for the service feature server by using, for example, a CTI interface and by connecting the operator switching position to the server via a local area network, without having to accept an excessive implementation outlay for the service features.

A particularly advantageous feature of a development of the described configuration in the service feature server and in the telecommunications system is that there are different ways for providing different service features, and there are further devices in the telecommunications system which coordinate the use of the devices for calling the service features, since the subscriber access lines are connected to the telecommunications system and it is possible to react specifically with regard to differently configured operator switching positions. Depending on the service feature configuration of the respective operator switching position, it is possible to access, on a case-by-case basis, only the devices for providing service features in the telecommunications system.

An advantageous feature of one development of the described configuration results in that the operator switching position has separate devices for access to service features of the telecommunications system and of the service feature server since, for this case, it is possible on the one hand to provide operator switching positions which can be expanded in modular form where, on the other hand, the implementation outlay for the devices for providing the service features on the service feature server can be kept low. It is thus advantageously possible to distinguish between access to standard service features on the telecommunications system and service features on the service feature server, even with regard to their provision.

An advantageous feature of a development of the described configuration of the operator switching position is for devices to be provided to select a call from a plurality of caller queues since, in this way and depending on the respective usage requirements, an operator call selection can be made which is queue-specific, is differentiated and cannot be automated.

Other features which are considered as characteristic for the invention are set forth in the appended claims.

Although the invention is illustrated and described herein as embodied in a method and configuration for operation of an operator switching position in a telecommunications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a flowchart summarizing the steps involved in performing the method of managing queues in a telecommunications system at an operator user interface.

DESCRIPTION OF THE PREFERRED EMBODIMENTS

Figure 1:
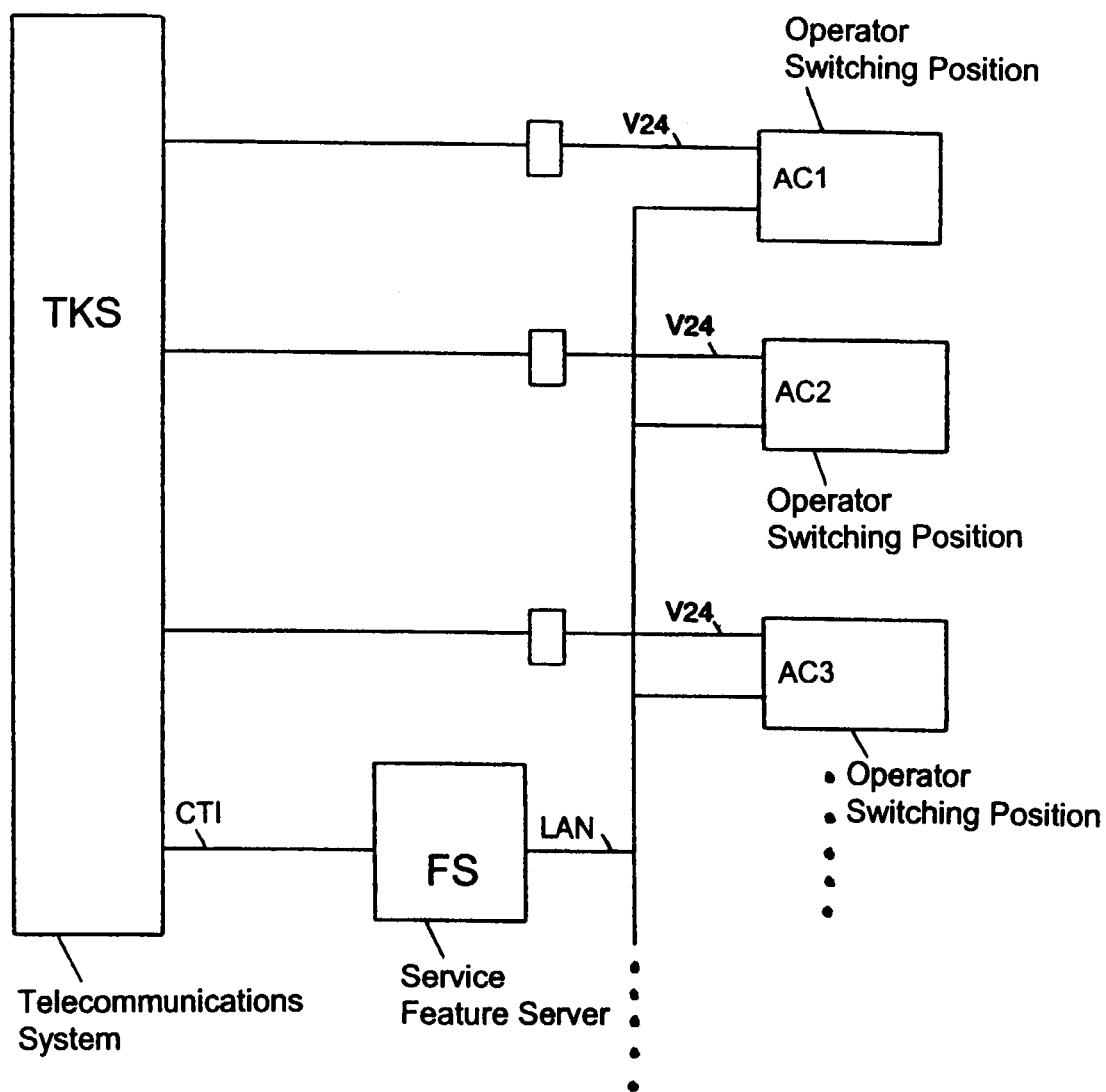
FIG. 1 is a diagrammatic, block diagram of a telecommunications system having a service feature server and operator switching positions according to the invention.

In all the figures of the drawing, sub-features and integral parts that correspond to one another bear the same reference symbol in each case. Referring now to the figures of the drawing in detail and first, particularly, to FIG. 1 thereof, there is shown a configuration for operating an operator switching position or location. The configuration includes, for example, a telecommunications system TKS, operator switching positions AC1, AC2, AC3 and a service feature server FS or performance/output feature server FS. The operator switching positions AC1–3 are connected to the telecommunications system TKS by, for example, access lines V24 via a parallel or serial interface. Furthermore, they are in this case connected to the service feature server FS via a local area network (LAN). The service feature server FS is in turn coupled to the telecommunications system TKS via an access line CTI. The service feature server FS is preferably connected via a computer telephone integration (CTI) interface, since the interface is standardized and the technical implementation complexity for providing additional service features thus remains low. For example, it is possible via the operator switching positions AC1–3 to access service features in the telecommunications system via the lines V24, or to access service features in the service feature server FS via the local area network and the CTI connection. Any desired number of operator manual switching positions AC may be provided in such a configuration without restricting the applicability of the invention.

Figure 2:
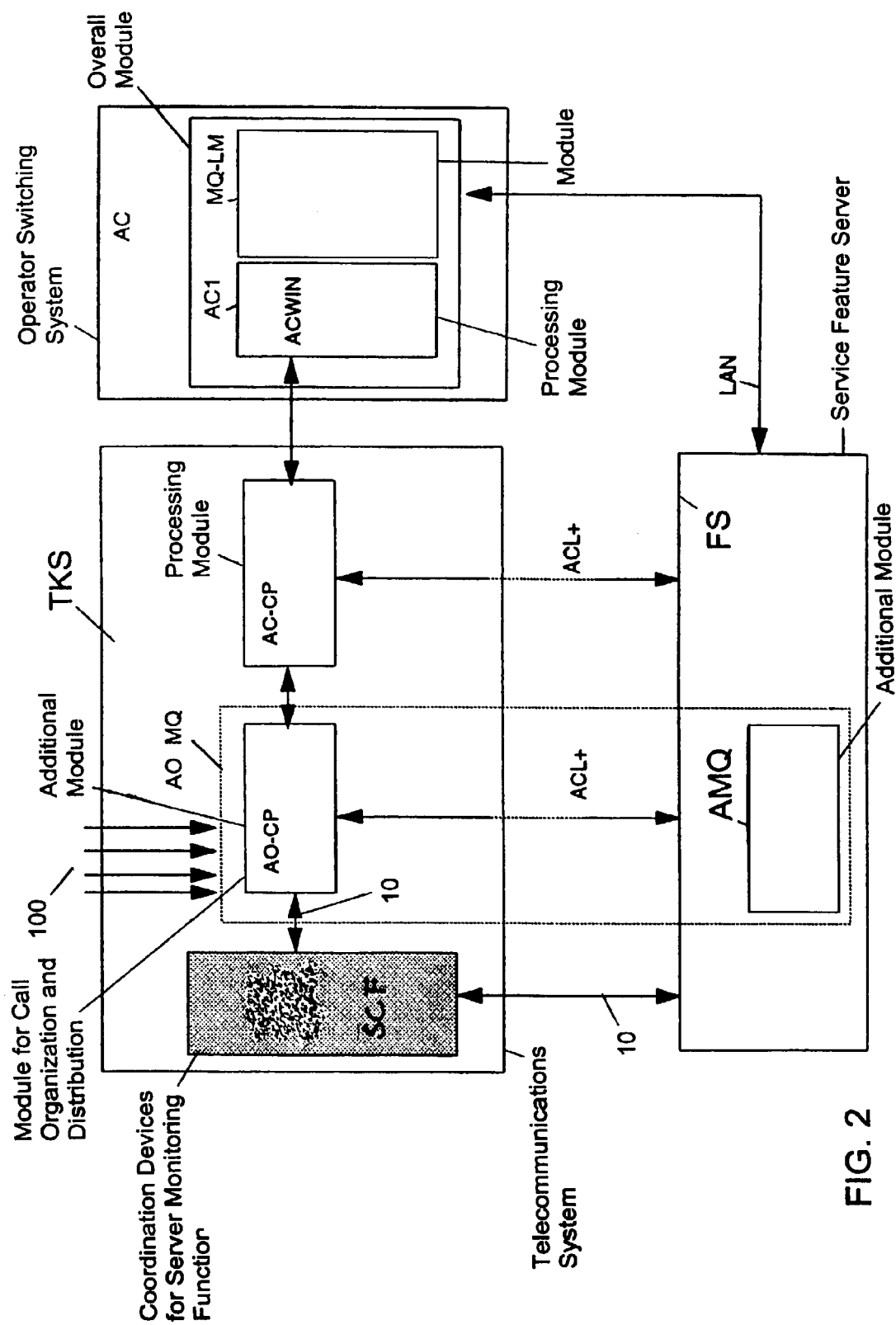
FIG. 2 is a block diagram showing devices necessary for providing service features, and their configuration.

As FIG. 2 shows, service features may be provided, for example, via different modules in the telecommunications system TKS, in an operator switching position AC and in the service feature server FS. For example, various internal and external calls 100 are waiting at the same time in the telecommunications system TKS for a free switching position, or else for a free position from a group of manual switching positions. According to the described method, a call organization for a plurality of queues AOMQ is carried out in the service feature server FS, while also using already existing devices in the telecommunications system TKS. The existing devices provide a standard call organization and distribution. The additional external devices in the service feature server FS provide, for example, a selectable option for call organization. To this end, in addition to a module AO-CP for automatic call organization and distribution, the service feature server FS contains an additional module AMQ for allocating the calls 100 to a plurality of queues and for parallel signaling to all the operator switching positions from, for example, one group for a call selection defined by the operator. Furthermore, the telecommunications system TKS contains the modules AO-CP for coordination of the standard functions and of the additional modules provided in the service feature server FS, in this case the additional module AMQ. Devices SCF for coordination of the server monitoring function are used (via lines 10 which are provided, for example, via a CTI interface) to define who is responsible for the distribution of the calls; the module AO-CP in the telecommunications system TKS, or the module AMQ in the service feature server FS. The arrows ACL+ indicate that modules in the communications system TKS may correspond with modules in the service feature server FS. In addition to the module AO-CP for call organization and distribution for a group of manual switching positions, the telecommunications system TKS contains modules for processing the distributed incoming calls and outgoing connections set up by the operator switching positions AC. The modules are denoted by AC-CP and, in this case, have no equivalent in the service feature server FS.

The operator switching position AC itself likewise contains modules ACWIN for processing standard call signaling and control elements for processing multiple queues MQ-LM. The two modules are, for example, combined in the operator manual switching position to form an overall module AC1. For the situation where the operator switching position AC has service features for processing a plurality of queues, that is to say via the module MQ-LM, it accesses the service feature server FS via the local area network LAN when calling such a service feature, in order to use the module AMQ that is provided there.

The configuration and organization of the modules shown here represents only one advantageous configuration and is not essential to the implementation of the invention. Any other desired configurations of modules are also feasible, in which service features that can be called up or can be controlled by the module SCF for controlling the service feature can be processed in the service feature server FS.

Figure 3:
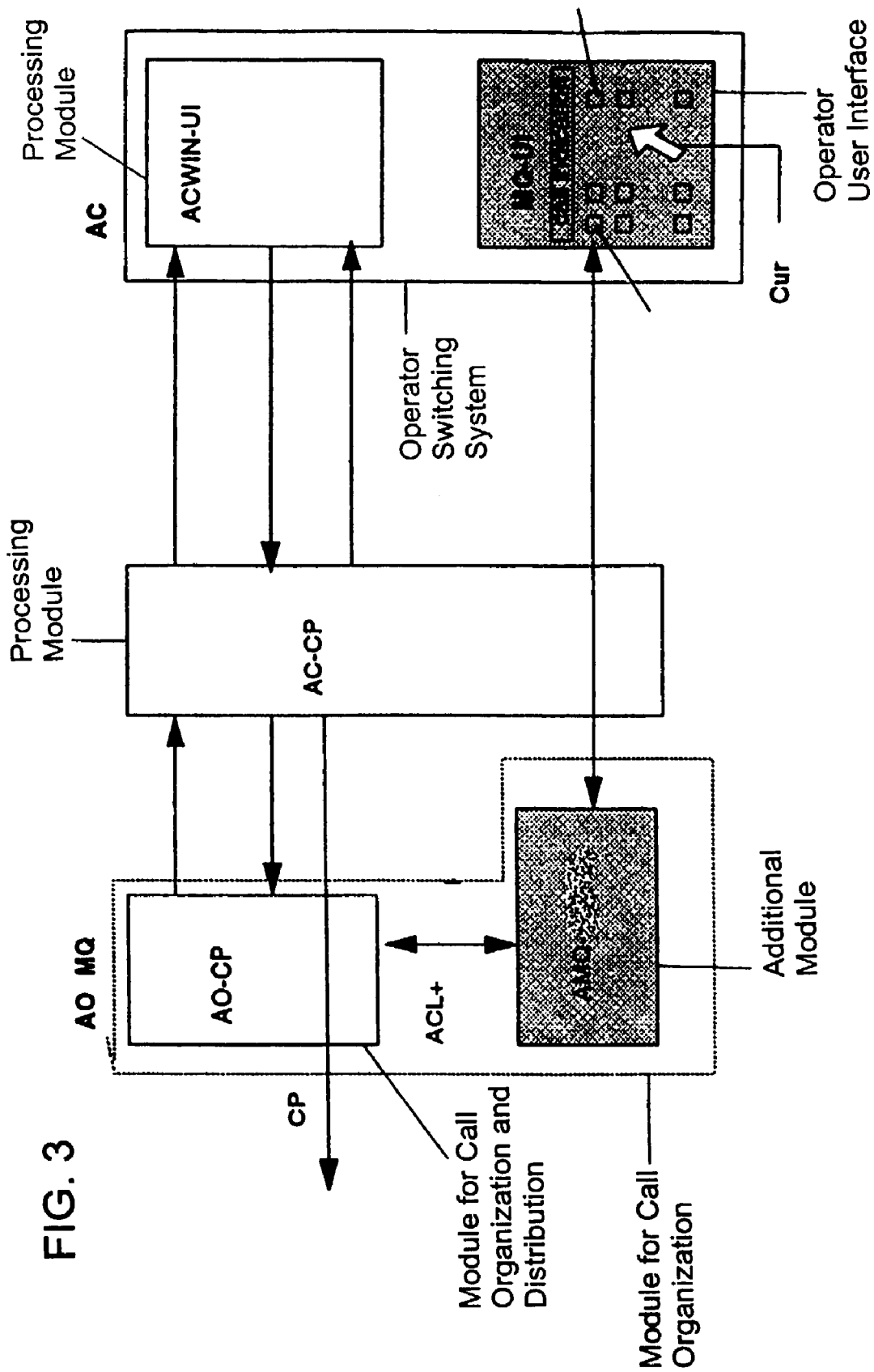
FIG. 3 is a block diagram showing sequences in the provision of the service features.

As FIG. 3 shows, call organization for a plurality of the queues AO-MQ can be carried out with the aid of the modules AO-CP, AMQ, AC-CP, ACWIN-UI and MQ-UI in the following manner. In this context, it should also be mentioned that all the names are used in the same way within all the figures and a cross-reference exists between modules and facilities having the same names.

For example, calls from internal and external subscribers arrive within the plurality of queues at the module AO-MQ for call organization. The calls are received by the module AO-CP and are passed on to the module AC-CP. The service feature in the service feature server FS is addressed, and the module AMQ there is used in order to provide a plurality of queues. The arrow 20 indicates how a call that is waiting in the call organizer module AO-MQ is passed on to the module in the selected operator switching position AC. The module AC-CP indicates to the operator switching position AC, on a suitably configured operator interface via 25, that a call is present. If only standard service features are used, that is to say no parallel processing of a plurality of queues by the operator switching position AC is envisaged, then the call is automatically assigned to a free operator switching position AC, for example in a group. After checking by the operator, a key message 35 is sent to the module AC-CP and a response message 45 is sent to the calling subscriber.

In the situation where the user-controlled selection of a call from a plurality of offered queues is provided in parallel via all the connected operator switching positions AC in the telecommunications system TKS, then a specific operator user interface MQ-UI is provided at the operator switching position AC, in order to indicate the keys and, for example, to select them by use of queues S1 and S5 etc. The selection field may preferably be configured in the form of a display on a computer screen, with the representation of the keys being selected by use of a cursor on the screen.

However, instead of selection on a computer screen, a special keyboard may also be provided, having keys which preferably have an LCD indication integrated in them. The parallel indication of the number of waiting callers per queue and the caller data for the next caller in the queue at all the operator switching positions AC is provided via the function module AMQ in the service feature server FS, via 50. The function module AMQ communicates via line ACL+ with the module AO-CP in the telecommunications system TKS whereupon, after checking a call, other operating processes/sequences take place as for the standard distribution.

Figure 4:
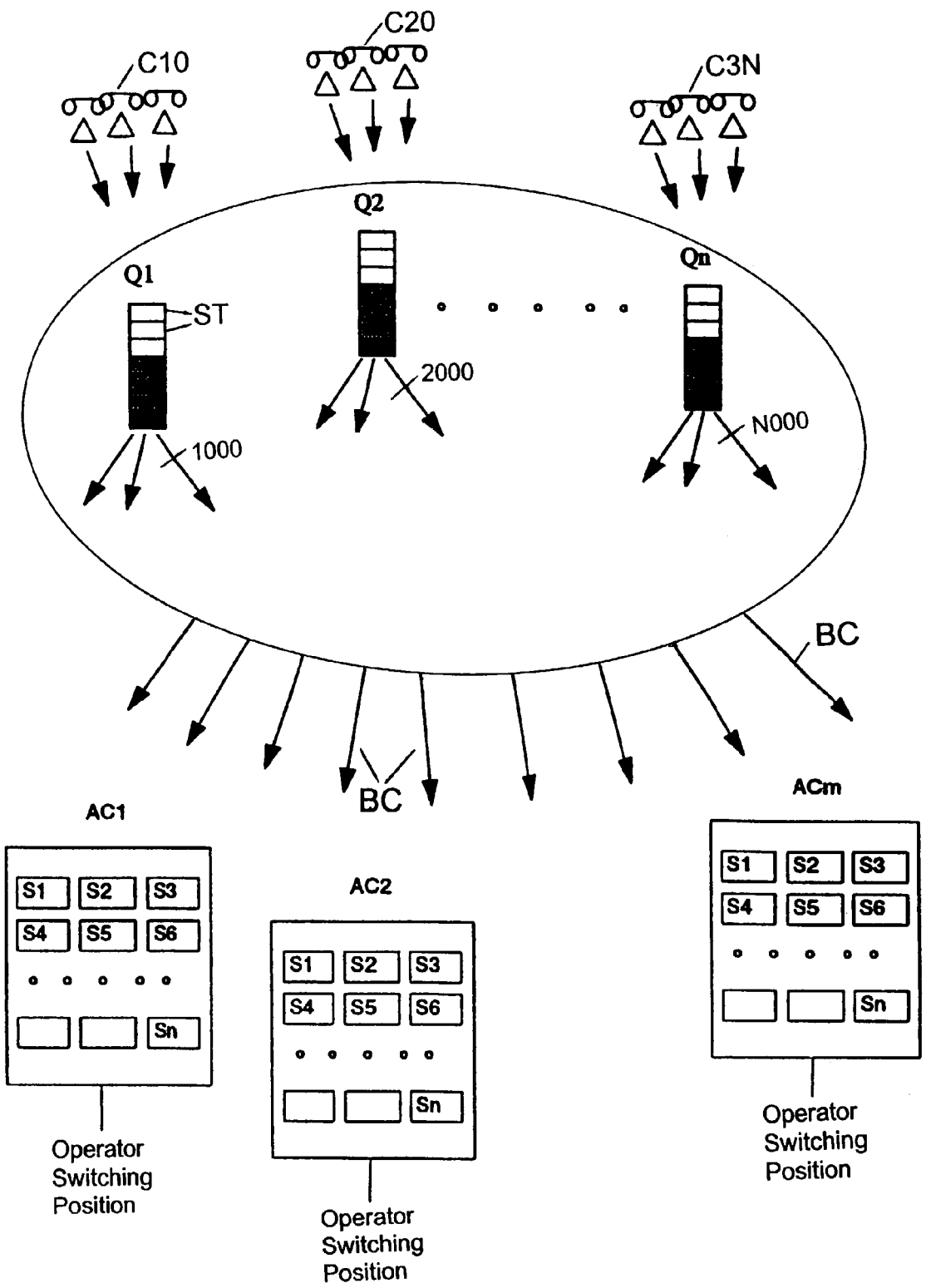
FIG. 4 is a diagram showing an assignment of callers to queues and to the operator switching positions.

FIG. 4 shows how different subscriber calls C10, C20 to C3n can be shared between different queues Q1, Q2, Qn. For example, the subscribers C10 are assigned to a queue Q1, the callers C20 to a queue Q2, and the subscribers C3n to a queue Qn. However, the subscribers C may also be distributed between a wide range of queues, on the basis of specific criteria. For example, the callers are disposed in the form of a stack ST one behind the other in the queue Q (see Q1 of FIG. 4). The waiting calls can then be passed on to a wide range of operator switching positions AC1 to Acn, via a round-robin function BC, via connections 1000, 2000 and n000.

An operator can then use keys S1 to Sn to select a respective caller from the calls in the respective queues Q. The modules ANQ, AO-CP, AC-CP are used to ensure that all the callers C, or the callers C who are at the front of the queues Q, are indicated to all the operators at their operator switching positions AC, and that the callers C can be selected, and that that operator who selects a waiting call first of all is connected to this call, while the others are presented with the next caller in the respective queue on the appropriate key. Within the queues, the callers C can be organized on the basis of their importance, specific specialist areas or any other desired criteria.

An incoming call is displayed in detail, for example when a mouse button is pressed. By way of example, the caller data that are known in the system, such as the name, telephone number and direction, are indicated on the display for the respective waiting call that is the next in the queue marked by the cursor Cur. This call can be selected by releasing the mouse button, at which point the selected call is coupled by the module AMQ to a free answering device in the answering operator switching position. In this situation, an automatic changeover can be made between the two operator interfaces for standard service features ACWIN-UI and the operator interface for additional service features MQ-UI.

Figure 5:
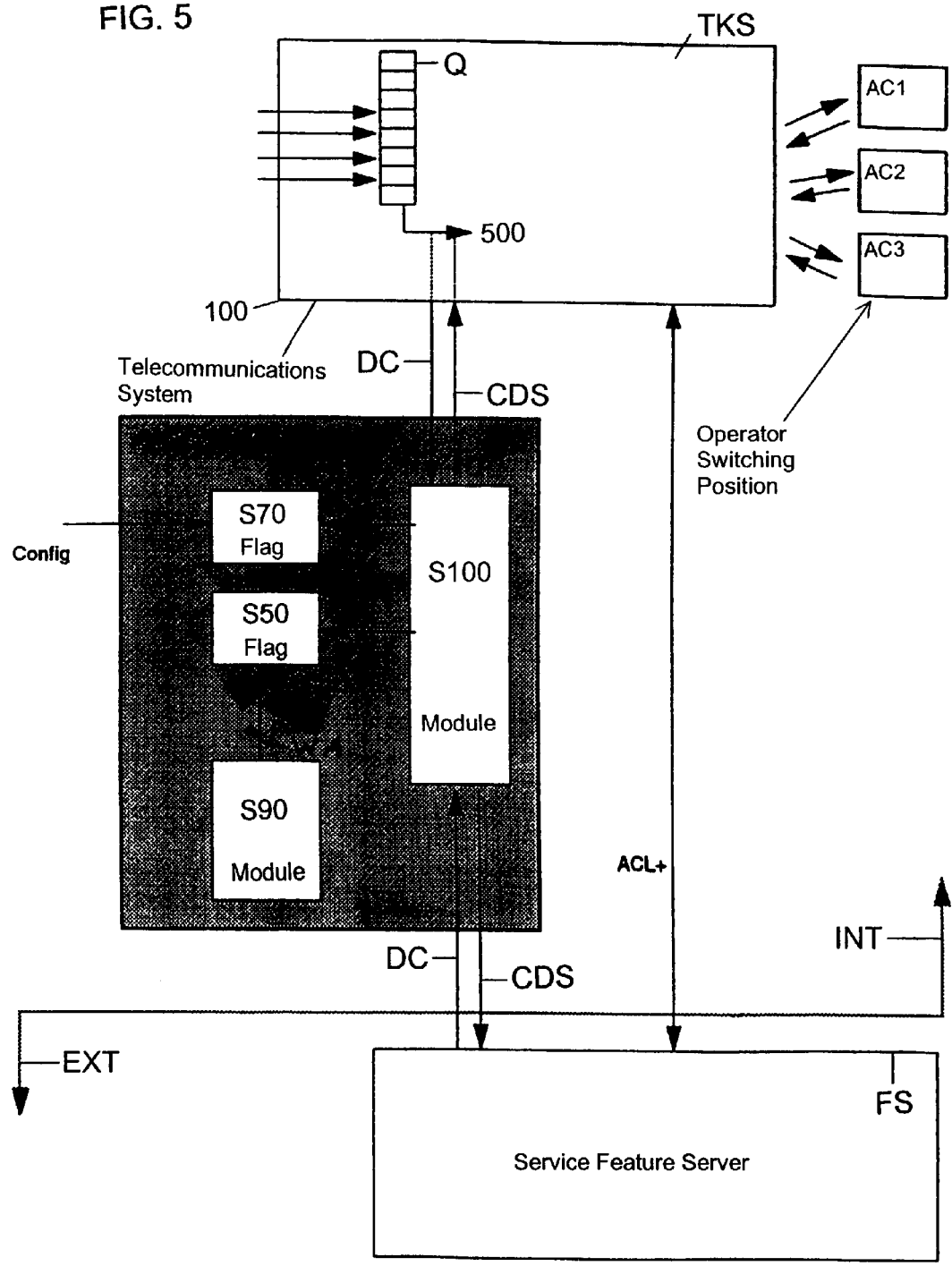
FIG. 5 is a block diagram showing the sequence when calling service features that are not available in the telecommunications system.

FIG. 5 shows the function of the module SCF when receiving calls from a plurality of subscribers, and during assignment of the calls, and during selection of the calls by operator switching positions AC1 to AC3. For example, the telecommunications system TKS already has an integrated implementation for processing two logic queues AQ and MQ for organization of subscribers in single queues and for organization of subscribers in parallel queues. The two logic queues are presented to the operator switching positions AC via 500, as already explained in FIG. 4, so that they have an overview of all the queues and all the subscribers, as well as the capability to select a connection to one of the subscribers.

For example, a distribution flag is checked via the module SCF, via which the service feature of the operator switching positions processing the plurality of queues is checked, and a decision is made on this basis as to whether the calls can or cannot be distributed to the plurality of operator switching positions AC. A distribution inquiry DC to the server control function SCF is started with regard to the calls 100 arriving in the queue Q. For example, server control flags S70 and S50 are checked by read access RA in a module S100. The flags are configurable via Config in an appropriate manner by use of prior inputs. Server control flags, which are only temporary, are stored in S50 and set, for example by a module S90, by use of write access for, for example, daytime and nighttime operation. The status of the two flags together indicates the responsible active module for the respective situation. External implementations of service features are likewise checked in the service feature server FS by use of DC. For example, there are devices there to process 12 queues and to distribute the calls to specifically grouped operator switching positions, or to all operator switching positions.

The result of the inquiry is passed on via CDS both to the telecommunications system TKS and to the operator switching position AC. The calls are presented to the operator switching positions AC in accordance with the checked result. Modules that are provided in the telecommunications system are denoted by INT and modules that are provided in the service feature server FS are denoted by EXT. ACL+ indicates that specific service features are implemented only in the service feature server FS. ACL+ can be implemented, for example, via a protocol for controlling switching functions in the telecommunications system TKS via an external computer.

FIG. 6 is a flowchart summarizing the steps involved in performing the method of managing queues in a telecommunications system at an operator user interface. Step 1 is making queue management-related service features available for an operator at a first operator user interface. Step 2 is providing the queue management-related service features from a dedicated service feature server. Step 3 is using the first operator user interface for communication with the service feature server when requesting and/or processing queues by an operator. Additional service features may be optionally provided, for example, by performing the following steps. Step 4 is using the first operator user interface for accessing a first subset of the queue management-related service features. Step 5 is providing, via the telecommunications system, a second subset of queue management-related service features. Step 6 is using the first operator user interface and/or a second operator user interface for accessing the second subset of queue management-related service features.

I claim:

1. A method of managing queues in a telecommunications system at an operator user interface, the method which comprises:
   making queue management-related service features available for an operator at the operator user interface;
   providing the queue management-related service features from a dedicated service feature server; and
   using the operator user interface for communication with the service feature server when at least one of requesting or processing queues by an operator;
   organizing the queue management-related service features into subsets;
   adding, via the telecommunications system, a further subset of queue management-related service features to the queue management-related service features in the dedicated service feature server; and
   communicating between the operator user interface and the telecommunications system with regard to the further subset of queue management-related service features.

2. The method according to claim 1, wherein the service feature server is programmed to provide subsets of queue management-related service features selected from the group consisting of splitting queues into several new queues, assigning waiting callers to queues, assigning queues to dedicated operators, signaling queues and calls to an operator, and making queues and calls accessible by an operator.

3. The method according to claim 2, wherein the telecommunications system communicates with the service feature server if access is made by the operator user interface to a service feature from at least one subset of the queue management-related service features in the service feature server.

4. The method according to claim 1, which comprises presenting a plurality of subscriber queues at the operator user interface requiring at least some of the queue management-related service features.

5. The method according to claim 4, which comprises selecting subscribers from the plurality of subscriber queues by using at least some of the queue management-related service features.

6. The method according to claim 1, which comprises:
defining the operator user interface as a first operator user interface;
using the first operator user interface for accessing a first subset of the queue management-related service features;
providing, via the telecommunications system, a second subset of queue management-related service features; and
using a second operator user interface for accessing the second subset of queue management-related service features.

7. A method of managing queues in a telecommunications system at an operator user interface, the method which comprises:
defining queue management-related service features for the telecommunications system;
providing at least one set of the queue management-related service features with a dedicated service feature server connected to the operator user interface and to the telecommunications system; and
communicating between the operator user interface and the service feature server when an operator at least one of requests or processes queues at the operator user interface;
providing a further set of queue management-related service features with the telecommunications system; and
communicating between the operator user interface and the telecommunications system with regard to the further set of queue management-related service features.

* * * * *